United States Patent Office 3,001,975
Patented Sept. 26, 1961

3,001,975
MONOEPOXIDATION OF ESTERS, MONOMERS, AND POLYMERS THEREOF
Ellington M. Beavers and Joseph L. O'Brien, Elkins Park, Pa., assignors to Rohm & Haas Company, Philadelphia, Pa., a corporation of Delaware
No Drawing. Filed Apr. 5, 1957, Ser. No. 650,819
15 Claims. (Cl. 260—86.1)

This invention is concerned with a selective method of epoxidation of one of the two terminal ethylenic linkages not conjugated with each other in a compound of the formula:

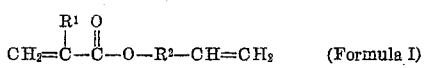
(Formula I)

where $R^1$ is hydrogen or a methyl radical, and $R^2$ is a divalent alkylene radical containing from two to nine carbon atoms. By this method, of the terminally located ethylenic linkages, only the ω-linkage in the alkenyl radical is epoxidized, and the α-ethylenic linkage in the methacryloyl or acryloyl residue is left intact. The resulting compounds are reactive monomers which may be represented by the formula:

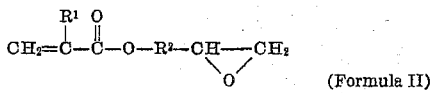
(Formula II)

where $R^1$ and $R^2$ are as defined above.

Compounds containing non-conjugated ethylenic unsaturation have been reported in the art to undergo epoxidation providing specific conditions are carefully observed. Such is the case of the epoxidation of unsaturated fatty acids like linolenic or palmitoleic acids. In these epoxidations the aim is to attack all of the ethylenic linkages and in their places to introduce oxirane oxygens. Similarly, the conversion of diethylenic compounds to bis-(dihydroxy) or bis(hydroxyacyloxy) compounds, which also must proceed under controlled specific conditions, results in the conversion of most ethylenic bonds. In contrast, the present method does not attack and epoxidize all of the ethylenic bonds but instead epoxidizes but one of the two ethylenic bonds while always preserving intact the other bond of unsaturation.

Heretofore a few isolated attempts to effect limited epoxidation of unsaturated compounds have been tried under conditions and on compounds differing critically from those used in the present invention. It has been observed, for instance, that there is a tendency for ethylenic bonds to be preferentially attacked, over a wide range of conditions, in the epoxidation of a compound which contains both ethylenic and acetylenic bonds. Also, limited epoxidation of polyethylenic unsaturated compounds having, not isolated, but conjugated diethylenic bonds has been proposed. Moreover, such attempts have been made with compounds having conjugated diethylenic bonds having substituents bonded thereto. For instance, isoprene monoxide in a small amount has been obtained. In contrast, the novel mono-epoxidation of this invention is applied to compounds containing only two non-conjugated ethylenic bonds having only the $R^2$ substituent on the bond being epoxidized. The epoxidation is carried out within a narrow relatively high temperature range under specific conditions. Heretofore no practical method has been available for selectively epoxidizing one of two non-conjugated ethylenic bonds. The type of compound employed for this selective epoxidation has definite characteristics and may be represented by Formula I above. In accordance herewith in this invention the starting materials are diethylenic compounds having truly isolated, non-conjugated, double bonds, separated by an alkoxycarbonyl group. Thus, the double bonds are α,ω-located, and the alkenoxy portion of the group contains from four to eleven carbon atoms. Starting comopunds containing more than eleven carbon atoms in the alkenoxy group are difficult to prepare and the resulting epoxy monomers are usually less desirable because of their considerable internal plasticization effect.

Since the ethylenic bonds in the starting materials employed are both located in the terminal positions within the molecule, they might be expected to be equally amenable to epoxidation. On the contrary, it has now been found that when the procedure herein set forth is followed, the ethylenic linkage in the methacryloyl or acryloyl residue is consistently left intact while the ethylenic bond in the ω-position is epoxidized. The success of this preferential epoxidation is even more unexpected where $R^1$ is methyl, since such close proximity to the ethylenic bond of this electron-releasing methyl group would seem to favor epoxidation of the α-located double bond. It is, however, the ω-situated ethylenic bond which is consistently epoxidized by the selective epoxidation of this invention.

The α,ω-ethylenically unsaturated starting compounds which may be effectively employed in this selective epoxidation include: 3-butenyl methacrylate, 3-butenyl acrylate, 4-pentenyl methacrylate, 4-pentenyl acrylate, 5-hexenyl methacrylate, 5-hexenyl acrylate, 6-heptenyl methacrylate, 6-heptenyl acrylate, 7-octenyl methacrylate, 7-octenyl acrylate, 8-nonenyl methacrylate, 8-nonenyl acrylate, 9-decenyl methacrylate, 9-decenyl acrylate, 10-undecenyl methacrylate, and 10-undecenyl acrylate.

The selective epoxidation of this invention comprises bringing together, in the presence of a small amount of a neutralizing agent, at a reactive temperature from about 30° to about 60° C., preferably in the range of 45° to 50° C., an α,ω-ethylenically unsaturated acrylic or methacrylic ester complying with Formula I above and peracetic acid, maintaining the temperature within said range until the epoxidation is substantially completed. The resulting oil phase contains a high ratio of ω-epoxyalkyl methacrylate or acrylate. This monoepoxide may be separated from the oil by conventional distillation or the oil may be employed as such.

The required α,ω-diethylenically unsaturated starting materials employed are prepared in a known manner by acid-catalyzed esterification of the corresponding α,ω-olefinic alcohols with excess glacial methacrylic or acrylic acids in an inert solvent in the presence of a polymerization inhibitor. Alternatively, by known procedures, the α,ω-diethylenically unsaturated esters may be prepared by base-catalyzed transesterification of the α,ω-ethylenically unsaturated alcohols with an ester of acrylic or methacrylic acid in the presence of a polymerization inhibitor. The α,ω-olefinic alcohols may also be reacted with acrylic or methacrylic anhydrides or with acryloyl or methacryloyl chlorides preferably in the presence of an HCl-acceptor, to yield the desired α,ω-diethylenically unsaturated esters.

For the transesterification there may be used such typical esters as methyl methacrylate, methyl acrylate, ethyl acrylate, ethyl methacrylate, isobutyl methacrylate, hexyl methacrylate, and 2-ethylhexyl acrylate. Among those esters the lower alkyl esters are preferred since the azeotrope formed therewith is removed with greater ease during transesterification.

The polymerization inhibitors that may be used during esterification or transesterification include di-β-naphthol, trinitrotoluene, hydroquinone, p-hydroxydiphenylamine, and similar inhibitors. However, since an inhibitor, such as p-hydroxydiphenylamine, sometimes forms colored oxidation products which are difficult to remove from the ester, it is preferred to use such polymerization inhibitors as 2,2'-bis(p-hydroxyphenyl) propane or N,N'-di- 2-(1,4-naphthoquinonyl)-p-phenylenediamine. The inhibitor should be used in an amount from about 0.1 to 10%, preferably from about 1 to 3%, based on the weight of total reactants.

The resulting esters conform to Formula I. Typical thereof are: 3-butenyl methacrylate, 3-butenyl acrylate, 4-pentenyl methacrylate, 4-pentenyl acrylate, 5-hexenyl methacrylate, 5-hexenyl acrylate, 7-octenyl methacrylate, 7-octenyl acrylate, 10-undecenyl methacrylate, and 10-undecenyl acrylate.

In accordance with this selective epoxidation herein referred to of one of the two terminal non-conjugated ethylenic bonds in the esters described above, such esters are reacted with an epoxidizing peracid under controlled conditions. Peracids found to be effective include perbenzoic acid, monoperphthalic, and peracetic acid in chloroform, ether and acetic acid, respectively. Of the peracids which maybe used, peracetic acid is preferred because it is commercially available and the yields of monoepoxide ester obtained, when it is used, are of substantial commercial interest at the present time.

Peracetic acid may be prepared by reacting glacial or aqueous acetic acid with aqueous hydrogen peroxide in the presence of about 1% of sulfuric acid as catalyst. The hydrogen peroxide may be the commercial 27.5% or 100 volume product or it may be an aqueous solution of high peroxide content as, for instance, 50 to 90% $H_2O_2$. Peracetic acid may also be prepared by other known procedures or it may be obtained commercially. While 85% peracetic acid solutions in acetic acid may be used, it is preferred for safety reasons to employ a 40% peracetic acid solution in acetic acid. The solvent for the peracetic acid is water-free and is also a solvent for the resulting monoepoxides.

In order to properly control and limit the selective monoepoxidation of this invention to one double bond only, it has been found that the reaction must be carried out in the presence of a specific basic agent in an amount within the range of about 0.5 to 10%, preferably of about 2.5 to 6.5% by weight of the peracetic solution used. Typical basic agents include alkali metal hydroxides, such as potassium or sodium hydroxide, and such buffering agents as the acetates of sodium and potassium, the carbonates and bicarbonates of potassium and the like. When used in the amounts specified, both the buffering or basic agents satisfactorily control the reaction. For this purpose the sodium or potassium salt of the acid which is the precursor of the peracid employed are very effective, and often sodium acetate is favored.

In the process of this invention the $\alpha,\omega$-ethylenic ester to be selectively monoepoxidized is charged to a reactor equipped with an agitator, cooling and heating means, a temperature recorder, a reflux condenser, and an addition tube. The ester is heated, while being stirred, to a temperature as close as practical to 50° C. but such that the exotherm resulting from the subsequent addition of the peracetic acid to the ester does not raise the temperature appreciably above 50° C. Therefore, the ester is initially heated to within a range of about 30° to about 45° C. To the heated ester there is added from about 1.0 to 1.5 moles and, preferably, 1.05 moles per mole of starting ester of 40% peracetic acid in acetic acid. Smaller amounts result in incomplete selective epoxidation. Quite unexpectedly, when larger amounts of peracid are used, for instance 2 moles of peracetic acid, no diepoxide is obtained but the yield of monoepoxide is reduced. It is therefore important for best results that the peracid be used within the amounts prescribed above.

With the peracetic acid there is previously mixed a small amount of buffering agent, such as sodium acetate, in an amount sufficient to maintain effective control of the reaction. The required amount is usually about 3% by weight of the peracetic acid solution used. The peracetic acid and buffering agent mixture is then added, while stirring, to the heated ester either continuously or portion wise. After a short induction period a moderate exotherm occurs. Cooling is applied to maintain the temperature of the mixture within the range of 40° to 50° C. and as close as practical to 50° C. While active mixing and cooling as required are continued the remainder of the peracetic acid is added. The epoxidation proceeds smoothly and the rate of disappearance of the peracetic acid is followed by periodic analysis of the reaction mixture. When all the peracetic acid has been added, heating to within a temperature range of 40° to 50° C. is continued while the reaction mixture is continuously stirred. Stirring and heating are continued until the rate of peracetic acid utilization has fallen to a low value. This usually occurs after four to five hours. At that time it is generally observed that about 91 to 96% of the theoretical amount of peracetic acid has been utilized. The reaction mixture is then separated into an aqueous and an organic phase. This is commonly performed at room temperature. The organic phase is an oil which comprises the monoepoxy, hydroxyacetoxy, and monoethylenic alkyl esters. The rate of separation of the organic phase from the aqueous phase may be promoted by the addition of water and by the addition of a water-immiscible liquid which is a solvent for the monoepoxy and monoethylenic alkyl esters. Typical useful hydrocarbon solvents include toluene, ether, xylene, heptane, octane, as well as chlorinated liquids such as ethylene dichloride and carbon tetrachloride. The organic phase then comprises substantial amounts of monoepoxy alkyl methacrylates or acrylates, generally in an amount of at least 70% and often in an amount more than 75% based on the weight of the oil. The remainder generally comprises hydroxyacetoxy monoethylenic esters, and a limited amount of dihydroxy derivatives. This monoepoxide ester oil is a very useful product which may be used as a monomeric polymerizable mixture in various applications. If desired, this oil fraction may be further purified by washing with a salt solution, such as saturated sodium chloride solution, and then with a neutralizing solution, such as sodium hydroxide solution. This monoepoxy alkyl methacrylate or acrylate monomeric composition in unuusal in being amenable to further polymerization reactions without requiring particular treatment. Preferably before use the oil monoepoxide is stripped by distillation, in the presence of a polymerization inhibitor, of any excess solvent that might be present. The monoepoxide ester is then removed by conventional methods such as by distillation under reduced pressure.

The procedure whereby a diunsaturated ester is mixed with the peracetic acid, in the presence or in the absence of the basic compound, at temperatures below reactive epoxidation temperatures and where the temperature then is raised to within the reactive range, gives results which are not equivalent to those obtained by the above described method.

It has now been found that in order to successfully prevent the epoxidation to extend to the other bond of unsaturation the temperature of reaction must not exceed 60° C. and preferably be maintained as close as possible to 50° C. On the other hand, in view of what has heretofore been proposed, it is unexpected that epoxidation can successfully be limited to one bond of unsaturation only, at such relatively high temperatures as above 30° C. and preferably in the range from about 40° to 50° C. Unexpectedly, the epoxidation, under the conditions above set forth, proceeds smoothly without any formation of polymeric products even in the absence of a polymerization inhibitor. Addition of polymerization inhibitor, therefore, may be omitted until final stripping of the resulting monoepoxide ester. If desired, however, the inhibitor may be added at any time before the epoxidation reaction. Polymerization inhibitors which may be used include such known inhibitors as p-hydroxydiphenylamine, N,N'-diphenylphenylenediamine, 2,5-di-tert.-butylhydroquinone, di-$\beta$-naphthol and the like. They may be used in an amount from about 0.1 to about 5% and preferably in the range of to 0.5 to 2%, based on the weight of starting ester. Two polymerization inhibitors, 2,2'-bis-(p-hydroxyphenyl) propane and even more especially N,N'-di-2-(1,4-naphthoquinonyl)-p-phenylenediamine, in the prescribed amount, have been found particularly effective in preventing polymerization during stripping, development of undesirable color, and resistance to attack by the peracid when added to the starting diethylenic ester before epoxidation takes place.

The ω-epoxy esters described above may be readily polymerized alone or with other compounds containing a vinylidene group, $CH_2=C<$. Such polymerization may be effectuated in bulk, in solution, or in emulsion. Examples of copolymerizable materials are alkyl esters of methacrylic and acrylic acids, the alkyl group of which is straight or branched, of one to eight carbon atoms. Illustrative alkyl groups are methyl, ethyl, isopropyl, n-butyl, n-octyl, and 2-ethylhexyl as well as the isomers of these radicals. Polymerization and copolymerization is effectuated at a temperature from about 0° to 100° C. preferably in the range from about 40° to 80° C. in the presence of suitable free-radical catalysts. Typical catalysts are: α,α'-bis-azo-isobutyronitrile, benzoyl peroxide, and stearoyl peroxide. The catalysts are used in an amount from 0.01 to 5% and preferably from 0.02 to 2% based on the weight of the polymerizable compound.

These copolymers are useful in coating compositions, paper treating and particularly for shrink-proofing and felt-proofing of textiles. In that respect 10,11-epoxy-undecyl methacrylate is of a particular interest as described further below.

The ω-epoxy alkyl methacrylates and the corresponding acrylates which may be obtained by this invention include: 3,4-epoxybutyl methacrylate, 3,4-epoxybutyl acrylate, 4,5-epoxypentyl methacrylate, 4,5-epoxypentyl acrylate, 5,6-epoxyhexyl methacrylate, 5,6-epoxyhexyl acrylate, 6,7-epoxyheptyl methacrylate, 6,7-epoxyheptyl acrylate, 7,8-epoxyoctyl methacrylate, 7,8-epoxyoctyl acrylate, 8,9-epoxynonyl methacrylate, 8,9-epoxynonyl acrylate, 9,10-epoxydecyl methacrylate, 9,10-epoxydecyl acrylate, 10,11-epoxyundecyl methacrylate, and 10,11-epoxyundecyl acrylate.

The following examples, which further disclose the invention, illustrate the new selective monoepoxidation of the particular diethylenic esters herein. The examples are not to be construed as limiting the invention in spirit or in scope.

EXAMPLE A

*Preparation of 3-buten-1-ol*

This olefinic alcohol may be prepared according to the procedure of H. Waldman and F. Petru, Chem. Ber. 83, 287 (1950). Partial dehydration of 1,3-butanediol over phthalic anhydride for about twenty-four hours at 230° to 260° C. yields a two-phase distillate which is collected. The dried crude 3-buten-1-ol is carefully fractionated giving 3-buten-1-ol of boiling point 112.5° to 115° C.; $n_D^{25}$ 1.4210 and $$n_{25}^{25}\ 0.841$$

hydroxyl number: found 705, calculated 780.

EXAMPLE B 4-penten-1-ol may be prepared following the procedure outlined by L. A. Brooks and H. R. Snyder in "Organic Synthesis," 25, 83 (1945). This preparation proceeds in two steps. In the first step tetrahydrofurfuryl alcohol is reacted with thionyl chloride and pyridine yielding 85% of tetrahydrofurfuryl chloride of boiling point 54° to 57° C./18 mm., $n_D^{25}$ 1.4529. Recation of tetrahydrofurfuryl chloride and sodium sand in absolute ether with subsequent hydrolysis gives an 85% yield of 4-penten-1-ol, boiling point 134° to 140° C.; $n_D^{25}$ 1.4285; hydroxyl number: found 631.5, calculated 652.

The preparation of alkenyl methacrylates or acrylates is typified by the preparation of 4-pentenyl methacrylate. A mixture of 80 grams (0.93 mole) of 4-penten-1-ol, 120 grams (1.4 moles) of glacial methacrylic acid, 600 ml. of anhydrous toluene, 4 grams of 2,2'-bis-(p-hydroxyphenyl) propane and 2 grams of concentrated sulfuric acid is refluxed for five hours during which 98.5% of the theoretical amount of water is separated at the top of a short fractionating column. The cooled solution is then washed with aqueous potassium carbonate and water. It is then dried with anhydrous magnesium sulfate and filtered. Another 4 grams of polymerization inhibitor is added; the toluene is removed by distillation through a short Vigreux column at 30 to 50 mm. The residue is distilled at 20 mm. The product which is collected is 4-pentenyl methacrylate; its boiling point is 76° to 82° C.; $n_D^{25}$ 1.4405, $D_4^{25}$ 0.906; saponification number: found 359, calculated 364.

Alternatively, the alkenyl acrylates and methacrylates may be prepared by transesterification of the olefinic alcohols with the alkyl esters of methacrylic or acrylic acid in the presence of a polymerization inhibitor. 4-penten-1-ol (1 mole) is heated under a fractionating column with 5 moles of methyl methacrylate in the presence of 6 grams of N,N'-di-2-(1,4-naphthoquinonyl)-p-phenylenediamine, and 0.5 gram of sodium in 10 ml. of methanol is added in two equal portions. The temperature is maintained at 98° to 115° C. for about five hours. The excess methyl methacrylate is removed under reduced pressure. The product separated by distillation is 4-pentenyl methacrylate.

4-pentenyl acrylate is prepared in similar manner as shown above.

The preparation of various methacrylates and acrylates conforming to Formula I is carried out with equivalent satisfactory results using 0.5 to 2% of N,N'-di-2-(1,4-naphthoquinonyl)-p-phenylenediamine as polymerization inhibitor. Other polymerization inhibitors, although effective, tend to decrease the purity of the resulting ester. All esterifications or transesterifications are carried out according to procedures well known in the art.

EXAMPLE C 5-hexen-1-ol may be prepared by application of the method of F. B. La Forge, N. Green, and W. A. Gersdorff in J. Am. Chem. Soc. 70, 3707 (1948). Treatment of Grignard reagent from 4-pentenyl bromide with gaseous formaldehyde gives 56% of 5-hexen-1-ol of boiling point 158° to 163° C.; $n_D^{25}$ 1.4340, $D_4^{25}$ 0.839; $M_D$: observed 31.08, calculated 30.97; hydroxyl number: found 536, calculated 561.

The other ω-olefinic alcohols are available commercially or are prepared by the application of known procedures.

EXAMPLE 1

*4,5-epoxypentyl methacrylate*

Into a 200 ml. three-necked flesk fitted with a stirrer, reflux condenser, thermometer, and addition tube there is placed 30 grams (0.195 mole) of 4-pentenyl methacrylate. To the rapidly stirred liquid, heated on a hot water bath to about 30° C., there is added in thirty minutes 37 grams (0.195 mole) of a 40% solution of peracetic acid in glacial acetic acid containing 1.1 grams of anhydrous sodium acetate. The temperature is carefully maintained between 40° and 55° C. for four additional hours. During this time the progress of the reaction is followed by periodic determinations of the residual peracid content. After four to five hours the reaction is substantially terminated. The mixture is then cooled to 30° C. and by addition of 150 ml. of water an oil is separated. The mixture is extracted with 50 ml. portions of ether. The combined ether extract is washed successively with water, ice-cold 5% sodium hydroxide solution, and water, followed by drying with anhydrous magnesium sulfate and filtration. The ether is removed by distillation, in the presence of 0.5 gram of 2,2'-bis-(p-hydroxyphenyl) propane, as polymerization inhibitor, through a short Vigreux column at atmospheric pressure. The resulting oil, containing as its major portion 4,5-epoxypentyl methacrylate, is polymerizable and is useful in various applications. The oil residue may be further distilled at reduced pressure, and the product which is 4,5-epoxypentyl methacrylate is collected and redistilled at: boiling point 67° to 72° C./0.8 mm. $n_D^{25}$ 1.4500, $D_4^{25}$ 1.020; $M_D$: observed 44.86, calculated 44.71; saponification number (theoretical 330) found 316, oxirane oxygen (theoretical 9.41%) found 9.20%. A good yield is obtained.

The same procedure is repeated but 0.5 gram of 2,2'-bis(p-hydroxyphenyl) propane is mixed with the starting 4-pentenyl methacrylate. The same product is obtained.

The same procedure as in Example 1 is followed, the temperature of reaction being carefully raised to within the range of 55° to 60° C. 4,5-epoxypentyl methacrylate is separated and purified as described above.

Example 1 is followed again using instead of anhydrous sodium acetate an equivalent amount of various other basic or buffering agents such as: potassium acetate, sodium carbonate, sodium hydroxide, potassium bicarbonate, potassium carbonate, and calcium carbonate. Equally satisfactory results are obtained.

When other polymerization inhibitors, such as p-hydroxydiphenylamine, are used, the yields of monoepoxide tend to be lower than when 2,2'-bis-(p-hydroxyphenyl) propane is employed.

EXAMPLE 2

4,5-epoxypentyl acrylate

In a flask fitted as in Example 1 there is placed 28 grams (0.20 mole) of 4-pentenyl acrylate and the liquid is heated, while stirring, to 45° C. During fifteen minutes there is then added 0.20 mole of a solution of 40% peracetic acid in glacial acetic acid in 1.1 grams of anhydrous sodium acetate. After a short induction period, a moderate exotherm occurs and the temperature is maintained below 50° C. by immersion of the reaction flask in an ice bath. Stirring at a temperature from about 45° to 50° C. is maintained for another four hours. The mixture is cooled, diluted with 75 ml. of water, and extracted with four 50 ml. portions of benzene. The combined benzene extract is washed twice with 100 ml. of brine, twice with ice-cold 5% sodium hydroxide solution, and again with three 100 ml. portions of brine. The benzene solution, after drying over magnesium sulfate, is filtered and stripped at partial aspirator pressure. One gram of 2,2'-bis-(p-hydroxyphenyl) propane is added to the pot before stripping. The resulting oil contains a major proportion of 4,5-epoxypentyl acrylate. The residue may be further distilled at reduced pressure. Analysis of the product, which is collected in good yields, confirms that it is 4,5-epoxypentyl acrylate.

N,N - di - 2 - (1,4 - naphthoquinonyl) - p - phenylenediamine in amounts from about 0.5 to 2% on the weight of the starting ester give equally good results. This inhibitor is also added to the starting ester; there is no loss in efficiency of the epoxidation reaction.

EXAMPLE 3

3,4-epoxybutyl methacrylate

Following the procedure of Example 1, 0.2 mole of 3-butenyl methacrylate is heated, while stirring, to about 40° C. and there is added 0.24 mole of a 40% solution of peracetic acid in glacial acetic acid to which there had been added 1.2 grams of sodium acetate. Heating within a temperature range of 40° to 60° C. is continued for about three to four hours after which time the reaction is substantially terminated, the peracetic acid having been substantially used up. Upon addition of water an oil is separated. The oil may also be further extracted with ether. The ether extract is washed with a cold sodium hydroxide solution, dried, and filtered. The ether is removed by distillation following the same procedure as described in Example 1. The oil comprises 3,4-epoxybutyl methacrylate as its major fraction, the remainder being acetoxy-hydroxy monoethylenic esters. This oil is useful for the preparation of polymers. 3,4-epoxy-butyl methacrylate may be distilled off at reduced pressure. This compound has a boiling point of 55° to 56° C./0.8 mm.; $n_D^{25}$ 1.4472, $D_4^{25}$ 1.038; molecular refraction: observed 40.21, calculated 40.09; saponification number: found 362, calculated 360; oxirane oxygen number: found 10.13, calculated 10.26. Further analysis fully identifies the compound as 3,4-epoxybutyl methacrylate.

3,4-epoxybutyl acrylate is obtained in good yields following the same general procedure as in Example 3 above.

EXAMPLE 4

5,6-epoxyhexyl methacrylate 0.2 mole of 5-hexenyl methacrylate is heated to about 20° C. in a three-necked flask fitted as in Example I. While heating is continued until the temperature reaches about 45° to 50° C. there is added in thirty minutes 0.3 mole of a 40% peracetic acid solution in glacial acetic acid to which there had been added 3.2 grams of anhydrous sodium acetate. The temperature is maintained as close as possible to 50° C. for another three hours after which time the reaction is substantially completed. The crude product comprising as its major fraction 5,6-epoxyhexyl methacrylate is useful in the preparation of polymers. This product may be purified, following the procedure of Example 1, by separating the oil, extracting with ether, washing, and distilling in the presence of N,-N'-di-2-((1,4 - naphthoquinonyl)-p-phenylenediamine as polymerization inhibitor. Further distillation yields 5,6-epoxyhexyl methacrylate. Its composition is confirmed by analysis. It has a boiling point of 61° to 68° C./0.01 mm.; $N_D^{25}$ 1.4510, $D_4^{25}$ 0.997; molecular refraction: found 49.63, calculated 49.33; saponification number: found 332, calculated 305; oxirane oxygen: found 8.70, calculated 8.40.

By substitution of 5-pentenyl methacrylate by 5-pentenyl acrylate above, there is obtained in a like manner good yields of 5,6-epoxypentenyl acrylate. Its composition is confirmed by analysis.

EXAMPLE 5

10,11-epoxyundecyl methacrylate 47.6 grams (0.2 mole) of 10-undecenyl methacrylate is heated to about 30° C. 3 moles of 40% peracetic acid solution in glacial acetic acid is added gradually. After four hours at 45° to 50° C. the reaction is substantially completed as shown by periodic determinations of the residual peracid content. The oil fraction is used for the preparation of polymers. Alternatively the oil phase is extracted, washed, and worked up as described above. The product is stripped in the presence of 2,2'-bis-(p-hydroxyphenyl) propane. The residue which is useful in polymerization reactions may be further distilled, under reduced pressure, and there is obtained a satisfactory yield of 10,11-epoxyundecyl methacrylate. Analysis confirms its composition. Boiling point 114° to 119° C./0.02 mm.; $n_D^{25}$ 1.4553, $D_4^{25}$ 0.949; $M_D$: calculated 72.50, found 72.77; saponification number: calculated 221, found 211; oxirane oxygen: calculated 6.30, found 6.27.

The same procedure as in Example 4 is followed and there is mixed with the ester about 1% by weight of N,N'-di-2-(1,4 - naphthoquinonyl)-p-phenylenediamine and the epoxidation is carried out as described. Even better yields of 10,11-epoxyundecyl methacrylate are obtained.

EXAMPLE 6

10,11-epoxyundecyl acrylate is obtained following the same general procedure as in Example 5 and using 10-undecenyl acrylate as starting material. Using polymerization inhibitors such as those recommended above results in improved yields.

10,11-epoxyundecyl methacrylate is an unusual monomer in having unexpected low toxicity in contrast to monomers like glycidyl methacrylate. Glycidyl methacrylate is known to have severe irritant effects on mammalian skin, causing abnormal burns, swelling and redness. This toxic effect has limited the utility of glycidyl methacrylate. 10,11-epoxyundecyl methacrylate has now been found devoid of objectionable irritant effect. Neither the 1 nor the 10% dilutions of this compound in xylene produced significant skin damage on the shaved bellies of rabbits. Moreover, the full strength monomer showed no irritant effects on the skin of rabbits in contrast to glycidyl methacrylate. This is illustrated below. The figures give the percentage of rabbits in which indicated effect was produced.

| Methacrylate | Irritant Effect | Erythema | Necrosis |
|---|---|---|---|
| Glycidyl | 40 | 10 | 50 |
| 10,11-Epoxyundecyl | none | none | none |

This unexpected advantageous property of 10,11-epoxyundecyl methacrylate makes this monomer safe in handling and manufacturing operations and consequently is of particular interest in polymerization reactions.

The amount of 10,11-epoxyundecyl methacrylate or acrylate in the copolymerizable mixtures should be from about 5 to 40% and preferably from 10 to 30% based on the total weight of the copolymerizable materials in the monomeric mixtures.

The emulsions which are employed in the process of treating textiles are prepared in a known manner. Such preparation is further set out in Example 7 below which serves to illustrate a utility of these special 10,11-epoxyundecyl esters.

EXAMPLE 7

The following components are placed in a 500 cc. flask equipped with thermometer and mechanical agitator: 80.0 grams butyl acrylate, 20.0 grams 10,11-epoxyundecyl methacrylate, 277 grams water, and 8.3 grams of an aqueous 70% solution of tert.-octylphenoxypolyethoxyethanol. The mixture is cooled to 15° C. and then there is added 0.12 gram of ammonium persulfate and 0.16 gram of sodium hydrosulfite. The mixture is agitated and over a period of about twenty minutes the temperature rose to 40° C. Agitation was continued for thirty minutes while the resultant emulsion cooled to room temperature.

The outstanding effectiveness of this emulsion in stabilizing wool against shrinking is determined by impregnating measured pieces of flannel with emulsion, drying, and heating the impregnated pieces of flannel at a temperature of 240° F., or higher, laundering the pieces in hot water, and then drying them and measuring the shrinkage. In this particular case the emulsion is applied at 3.5% solids to a bleached flannel fabric, followed by heating for ten minutes at 300° F. in the presence of an acidic catalyst. The treated flannel shows zero shrinkage in a standard laundering test (140° F. for three hundred minutes) which produce 39% shrinkage in the untreated flannel control.

It is particularly noted that the treated flannel material has a good "hand" or feel and that the harshening effect on the wool is appreciably less than that produced by copolymers of butyl acrylate with conventional other reactive monomers.

In a similar way as in Example 7 emulsions are made of copolymers containing 30% 10,11-epoxyundecyl methacrylate and 70% butyl acrylate, the other components remaining the same. Similarly there are prepared emulsions with concentrations of 10% 10,11 epoxyundecyl ester. Also butyl acrylate is substituted with proper amounts of ethyl acrylate, octyl acrylate, butyl methacrylate, propyl acrylate, and similar other alkyl esters of methacrylic or acrylic acids. All wool-containing fabrics treated with these emulsions show good stability against shrinking and felting.

We claim:
1. A method for preparing 4,5-epoxypentyl methacrylate which comprises admixing 1.0 to 1.5 moles of a peracetic acid solution to 4-pentenyl methacrylate in the presence of 0.5 to 10% of sodium acetate on the weight of the peracetic acid and maintaining the temperature in the range of 30° to about 50° C. until monoepoxidation is completed.

2. A method for preparing 3,4-epoxybutyl methacrylate which comprises admixing 1.0 to 1.5 moles of a peracetic acid solution to 3-butenyl methacrylate in the presence of 0.5 to 10% of sodium acetate on the weight of the peracetic acid and maintaining the temperature in the range of 30° to about 50° C. until monoepoxidation is completed.

3. A method for preparing 5,6-epoxyhexyl methacrylate which comprises admixing 1.0 to 1.5 moles of a peracetic acid solution to 5-hexenyl methacrylate in the presence of 0.5 to 10% of sodium acetate on the weight of the peracetic acid and maintaining the temperature in the range of 30° to about 50° C. until monoepoxidation is completed.

4. A method for preparing 10,11-epoxyundecyl methacrylate which comprises admixing 1.0 to 1.5 moles of a peracetic acid solution to 10-undecenyl methacrylate in the presence of 0.5 to 10% sodium acetate on the weight of the peracetic acid and maintaining the temperature in the range of 30° to about 50° C. until monoepoxidation is completed.

5. A monomer of the formula

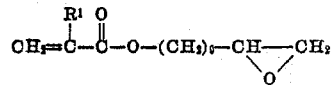

in which $R^1$ is selected from the group consisting of a hydrogen atom and a methyl group.

6. An addition polymer of a monomer of claim 5.

7. An addition copolymer of at least 1 percent by weight of a compound of claim 5 and at most 99 percent by weight of an alkyl ester of an acid of the class consisting of acrylic and methacrylic acids, in which the alkyl group contains one to eight carbon atoms.

8. A composition comprising an aqueous dispersion of a polymer selected from the class consisting of alkyl esters of acrylic and methacrylic acids in which the alkyl groups contain from 1 to 8 carbon atoms and an epoxy acrylate monomer having the formula

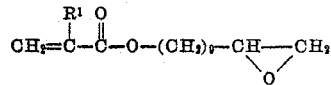

in which $R^1$ is selected from the group consisting of a hydrogen atom and a methyl group, said epoxy acrylate monomer forming 5% to 40% by weight and the alkyl acrylate forming 95% to 60% by weight of the polymer molecule.

9. The composition of claim 8 wherein the monomer is 10,11-epoxyundecyl methacrylate.

10. The composition of claim 9 wherein the alkyl ester is butyl acrylate.

11. The method of selectively monoepoxidizing the ω-located ethylenic bond in the alkenyloxy moiety of an ester of the formula

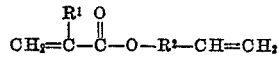

in which $R^1$ is selected from the group consisting of a hydrogen atom and a methyl group, and $R^2$ is an alkylene radical containing from two to nine carbon atoms, which comprises bringing together said ester with about 1.0 to about 1.5 moles of an epoxidizing peracid, in the presence of a basic agent selected from the group consisting of the carbonates, bicarbonates, hydroxides and oxides of the alkali metals and alkaline earth metals and the salt of the acid which is the precursor of said epoxidizing peracid, in an amount of at least 0.5 percent by weight of the peracid solution and at a temperature in the range of about 30° to about 60° C., until substantial completion of the monoepoxidation.

12. The method of selectively monoepoxidizing the ω-located ethylenic bond in the alkenyloxy moiety of an ester of the formula:

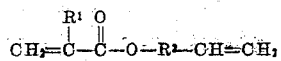

in which $R^1$ is selected from the group consisting of a hydrogen atom and a methyl group, $R^2$ is an alkylene radical containing from two to nine carbon atoms, which comprises bringing together said ester with about 1.0 to about 1.5 moles of peracetic acid, in the presence of a basic agent selected from the group consisting of the carbonates, bicarbonates, hydroxides and oxides of the alkali metals and alkaline earth metals and the salt of the acid which is the precursor of said epoxidizing peracetic acid, in an amount of at least 0.5 percent by weight of the peracetic acid and at a temperature in the range of about 30° to about 60° C. until substantial completion of the monoepoxidation.

13. The method of selectively monoepoxidizing the ω-located ethylenic bond in the alkenyloxy moiety of an ester of the formula

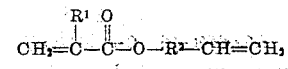

in which $R^1$ is selected from the group consisting of a hydrogen atom and a methyl group, and $R^2$ is an alkylene radical containing from two to nine carbon atoms, which comprises admixing 1.0 to 1.5 mole of an epoxidizing peracid to said ester, in the presence of 0.5 to 10 percent by weight of the peracid of a basic agent selected from the group consisting of the carbonates, bicarbonates, hydroxides and oxides of the alkali metals and alkaline earth metals and the salt of the acid which is the precursor of said epoxidizing peracid, and maintaining the temperature in the range of about 30° to 55° C. until substantial monoepoxidation is completed.

14. The method of claim 13 in which the peracid is peracetic acid.

15. The method of claim 14 in which the basic agent is sodium acetate.

References Cited in the file of this patent

UNITED STATES PATENTS

| | | |
|---|---|---|
| 2,485,160 | Niederhauser et al. | Oct. 18, 1949 |
| 2,524,432 | Dorough | Oct. 3, 1950 |
| 2,556,075 | Erickson | June 5, 1951 |
| 2,680,109 | Stevens et al. | June 1, 1954 |
| 2,794,029 | Phillips et al. | May 28, 1957 |

FOREIGN PATENTS

| | | |
|---|---|---|
| 530,811 | Canada | Sept. 25, 1956 |